United States Patent [19]
Godbersen

[11] Patent Number: 5,417,447
[45] Date of Patent: May 23, 1995

[54] SINGLE PLACE PERSONAL WATERCRAFT TRAILER

[76] Inventor: Byron L. Godbersen, Lake June Estates, Ida Grove, Iowa 51445

[21] Appl. No.: 266,988

[22] Filed: Jun. 28, 1994

[51] Int. Cl.$^6$ .............................................. B60P 3/10
[52] U.S. Cl. ................................ 280/414.1; 254/369; 414/559
[58] Field of Search ............... 280/414.1; 414/559; 254/218, 223, 369, 376

[56] References Cited

U.S. PATENT DOCUMENTS

| | | |
|---|---|---|
| D. 346,772 | 5/1994 | Godbersen . |
| 4,078,821 | 3/1978 | Kitterman . |
| 4,445,669 | 5/1984 | Wilson .............................. 254/369 |
| 4,464,092 | 8/1984 | Chambers et al. ............ 280/414.1 |
| 4,519,738 | 5/1985 | Wood . |
| 4,529,217 | 7/1985 | Wood . |
| 4,687,219 | 8/1987 | Rendzio ........................ 280/414.1 |
| 4,717,165 | 1/1988 | Johnson ........................ 280/414.1 |
| 4,779,888 | 10/1988 | Raymond . |
| 4,801,153 | 1/1989 | Wilson . |
| 4,820,111 | 4/1989 | Godbersen . |
| 4,986,571 | 1/1991 | Godbersen . |
| 4,997,332 | 3/1991 | Johnson ........................ 280/414.1 |
| 5,016,896 | 5/1991 | Shafer . |
| 5,060,963 | 10/1991 | Godbersen . |

Primary Examiner—Mitchell J. Hill
Attorney, Agent, or Firm—Henderson & Sturm

[57] ABSTRACT

A boat trailer having a wheel and axle supported frame including a pair of V-shaped cross members supporting a pair of elongated, laterally spaced bunks for supporting a single personal watercraft, a tongue unit longitudinally adjustably attached to the front of the frame, and a winch mounting assembly including a winch post longitudinally adjustably mounted on the tongue in a plurality of vertically adjustable positions for carrying a bow stop and a ratchet-action winch mounted intermediate the ends of the post for strap engagement with the watercraft.

11 Claims, 5 Drawing Sheets

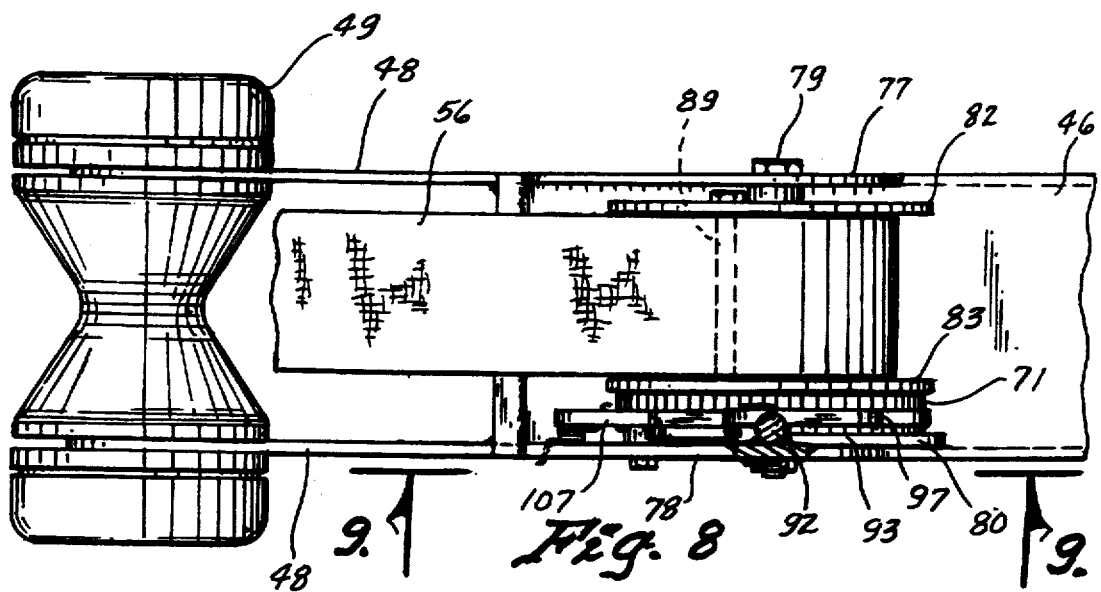
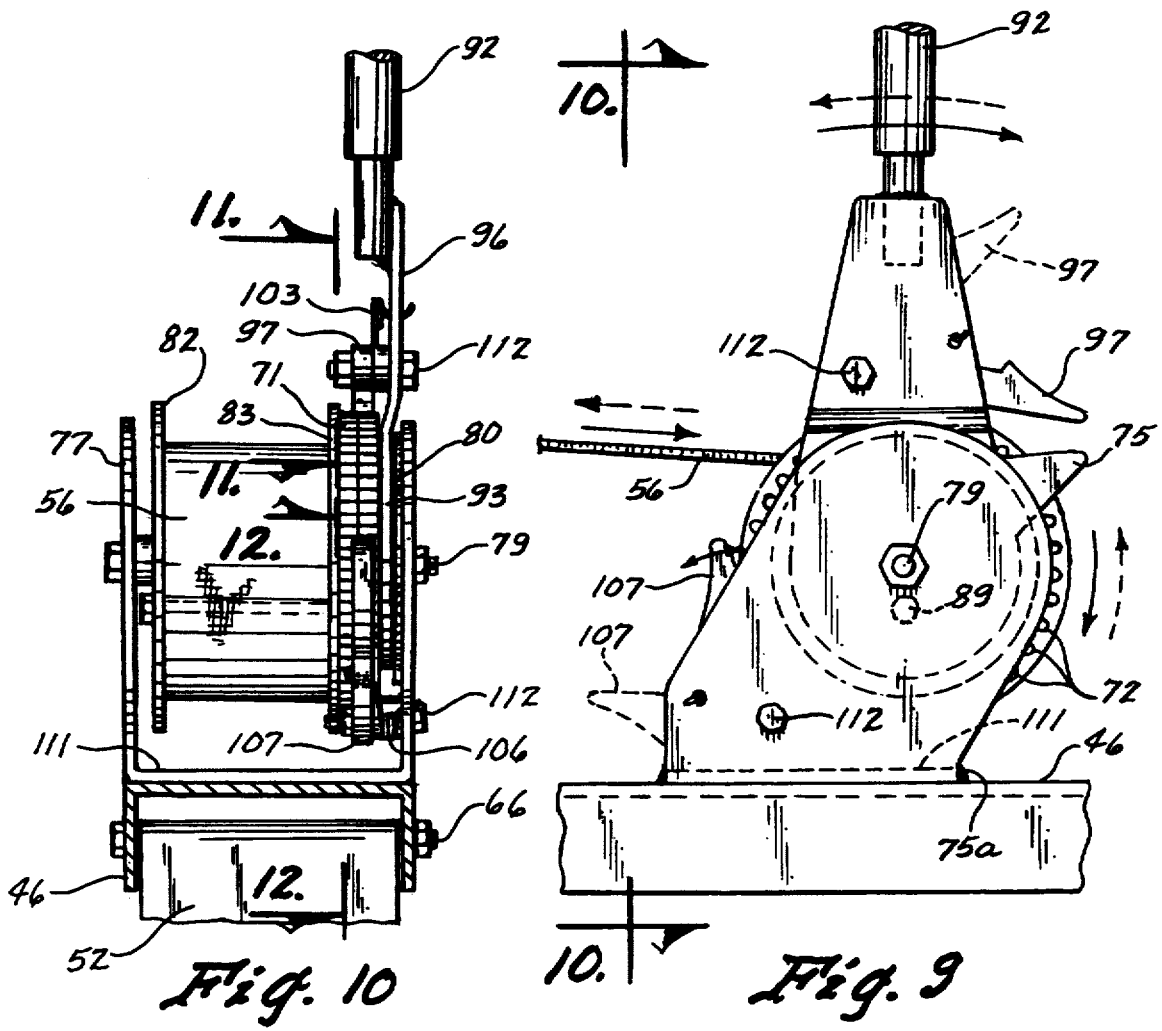

SINGLE PLACE PERSONAL WATERCRAFT TRAILER

TECHNICAL FIELD

The present invention relates to boat trailers in general, and in particular to a trailer for supporting a single place personal watercraft or like pleasure boat.

BACKGROUND ART

Although the advent in the pleasure boat field of personal ski boats and the like brought a plethora of streamlined and stylish ski boats to satisfy those of all persuasions as to boat styles and sizes, the trailers for supporting and transporting this new personal phenomenon of the boating industry remained of the work horse type. Thus the contemporary trailers comprised a generally box-type frame with cross members supported by conventional brackets, either bunk or roller units, and with one or more vertically upright posts on the tongue or interior frame members for supporting winches. Although these ski boat trailers were functional, they were certainly susceptible to structural and design improvements to bring them at least even with the innovations of that which they carried, the personal watercraft. Improvements of such contemporary trailers have been made as to two-place personal watercraft trailers as shown in my copending application Ser. No. 08/164,349, and it is seen herein that certain other improvements are incorporated in a single place personal watercraft trailer.

DISCLOSURE OF THE INVENTION

The improved single place personal watercraft trailer includes a frame having V-shaped cross members which allow the watercraft to set low on the frame; with a tongue that is removable and adjustable forward and backward to accommodate various size units and also allows for proper winch post adjustment. A unique ratchet winch system comprises a two piece winch post having a bow stop on the rear end and an adjustable, movable front end with a ratchet winch and strap unit intermediate, with adjustment positions cooperating with a strap for vertically adjusting the post relative to the tongue. Thus, the winch unit is readily vertically and longitudinally adjustable for accommodating the various size watercraft.

It is an object of this invention to provide an improved trailer for supporting a single personal watercraft.

It is another object of this invention to provide a trailer for accommodating various sizes of single personal watercraft.

Yet another object is to provide an improved tongue and winch mounting structure for a single place watercraft trailer.

Another object is to provide an improved winch mounting structure capable of both vertical and longitudinal adjustment of the winch relative to the front of the trailer frame.

BRIEF DESCRIPTION OF THE DRAWINGS

These and other attributes of the invention will become more clear upon making a thorough review and study of the following description of the preferred embodiment, particularly when reviewed in conjunction with the drawings, wherein:

FIG. 8 is an enlarged plan view taken along the line 8—8 in FIG. 8;

FIG. 9 is a side elevational view taken along the line 9—9 in FIG. 8;

FIG. 10 is a rear elevational view of the winch unit as taken along the line 10—10 in FIG. 9;

BEST MODE FOR CARRYING OUT THE INVENTION

Figure 2:
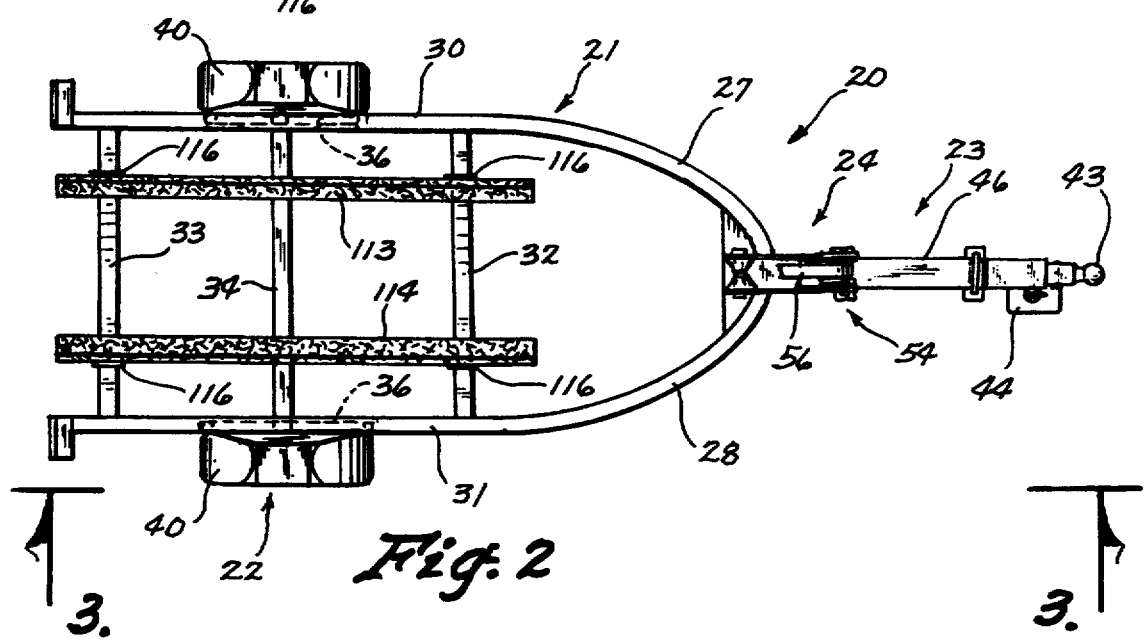
FIG. 2 is a plan view of the trailer of FIG. 1.
Figure 3:
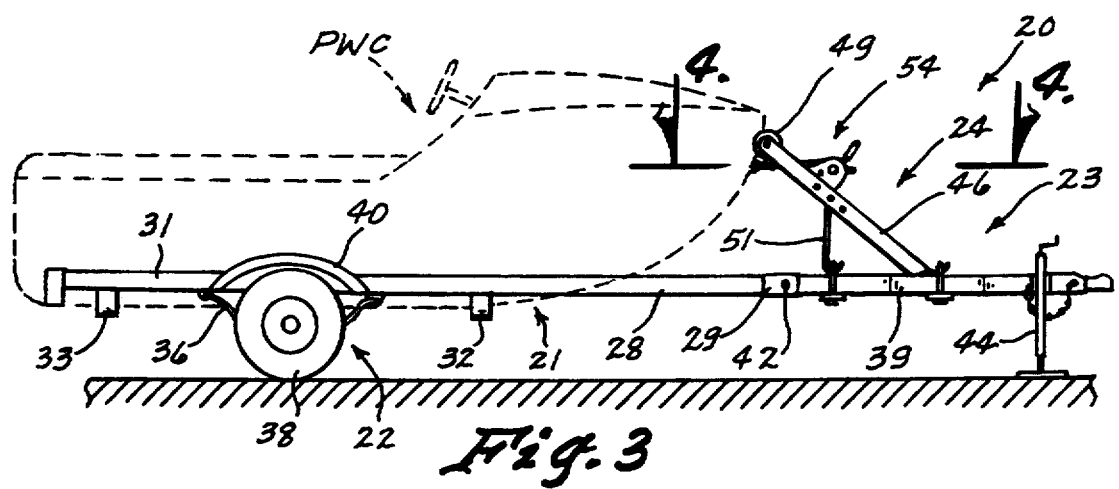
FIG. 3 is a side elevational view as taken along the lines of FIG. 2, and showing a personal watercraft supported on the trailer by dashed lines.
Figure 4:
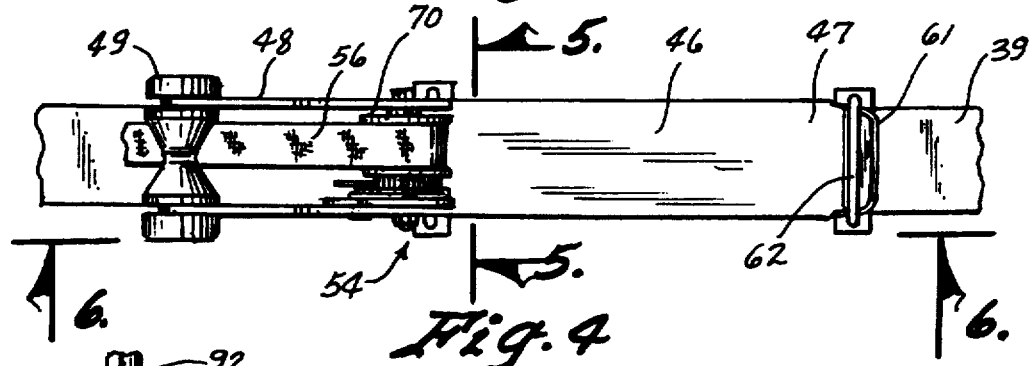
FIG. 4 is an enlarged fragmentary plan view of the winch mounting unit as taken along the lines 4—4 in FIG. 3.
Figure 5:
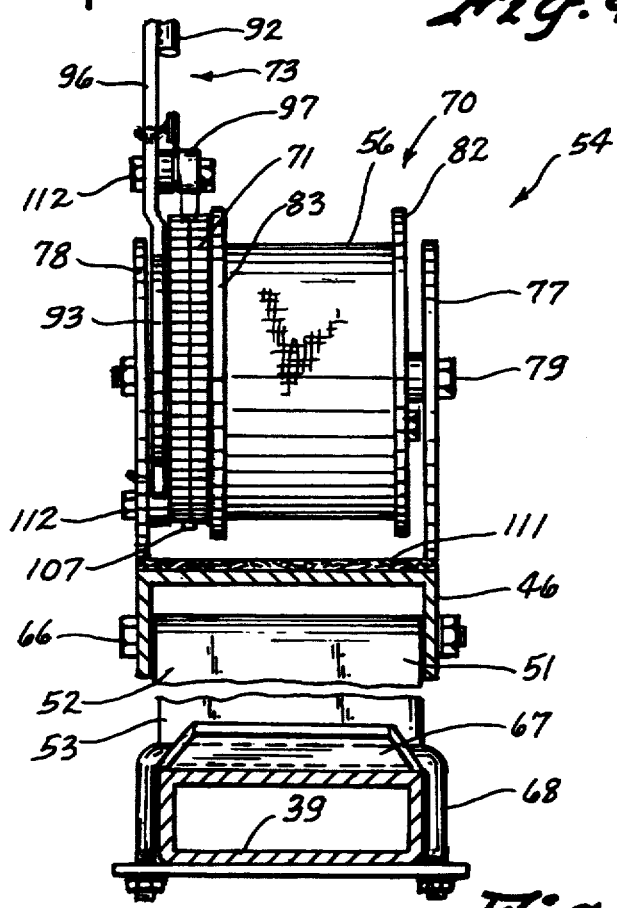
FIG. 5 is an enlarged front elevational view as taken long the line 5—5 in FIG. 4.

Referring now to the drawings, the boat trailer of this invention is illustrated generally at (20) and comprises a frame unit (21) (FIGS. 1-3), a wheel and axle assembly (22) for supporting the frame unit (21), a tongue unit (23) adjustably attached to the frame unit (21) and upon which is adjustable mounted a winch post assembly (24), and a bunk unit (26) for supporting a single personal watercraft (PWC) shown in phantom in FIG. 3.

Figure 1:
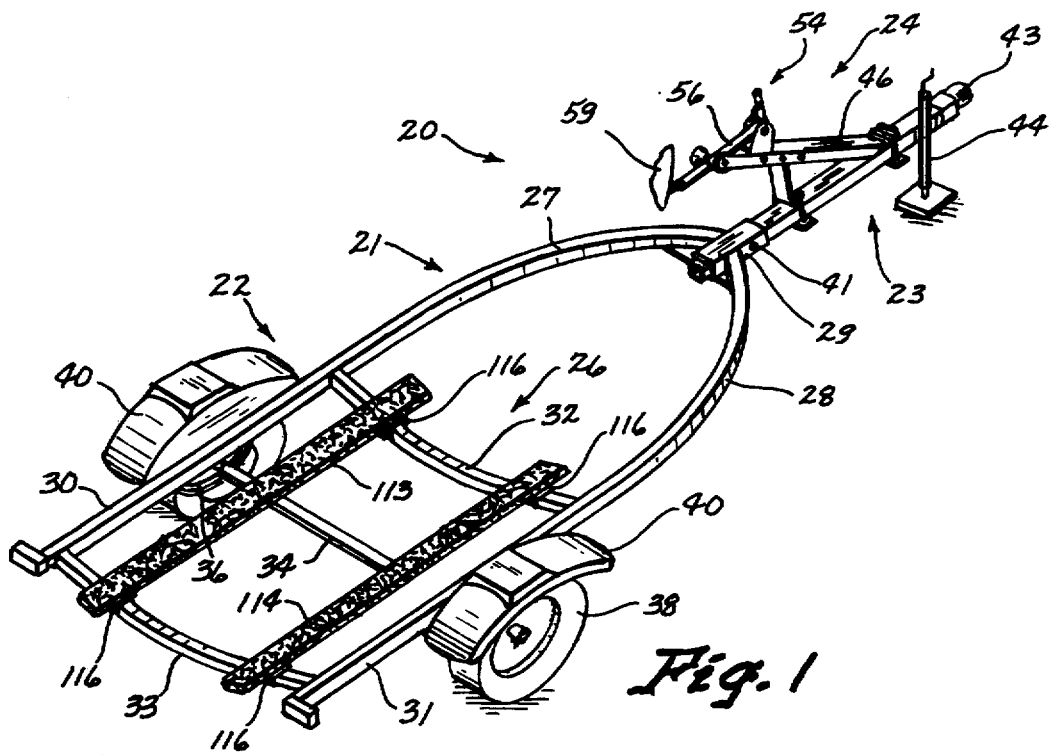
FIG. 1 is a perspective view of the boat trailer of this invention.

More particularly, the frame unit (21) has a U-shape and is comprised of forwardly and inwardly curved side portions (27), (28) joined at their forward ends by a hollow stub channel (29) extended along the longitudinal axis of the trailer (20), with a straight side portions (30), (31) extended parallel each other in laterally spaced relation and integral with the forward side positions (27), (28) (FIGS. 1 and 2). The straight side portions (27), (28) are joined together by parallel, longitudinally spaced cross members (32), (33). The cross members (32), (33) have a V-shape which allows the watercraft (PWC) to set low in the frame unit (21).

The wheel and axle assembly (22) includes a transverse brace (34) connected to each outer end to a leaf spring (36) as by U-bolts (37), each leaf spring (36) connected to a respective frame side portion (30), (31) (FIG. 3). A wheel unit (38) is rotatably mounted at each end of the brace (34) and covered by a fender (40). The tongue unit (23) comprises an elongated tongue (39) longitudinally and adjustably mounted within the stub channel (29), having a plurality of longitudinally spaced openings (not shown) each transversely alignable with an opening (41) formed in the channel (29) for receipt of a fastener (42) for locking the tongue (30) within the channel (29). A hitch coupler (43) is mounted on the front end of the tongue (39) for releasable connection to a prime mover (not shown), and the winch post assembly (24) is longitudinally and vertically adjustably mounted on the tongue (39) intermediate the coupler (43) and the stub channel (29). A jack device (44) (FIGS. 1 and 3) is optional and can be mounted to the tongue (39) for holding the trailer (20) level as desired.

Referring particularly to FIGS. 4–12, the winch post assembly (24) comprises generally a mounting post (46) having a forward end (47) adjustably secured to the tongue (33) and a rear end (48) with a conventional bow stop (49) secured thereto; a mounting strap (51) having an upper end (52) (FIG. 6) secured to the post (46) and a lower end (53) secured to the tongue (39) in a manner whereby the post (46) can be not only longitudinally adjustable on the tongue (39), but also vertically adjustable such that proper winch post (46) adjustment can be accomplished to help accommodate the trailer (30) to various size watercraft (PWC).

Such adjustment is enhanced by the longitudinal adjustment of the tongue (39) itself relative to the frame (21). The winch post assembly (24) is completed with a ratchet-type winch unit (54) mounted on the post (46) intermediate the forward end (47) and the bow stop (49), and having an elongated, flexible strap (56) with a free end clasp (57) releasably engageable with a bow eye (58) (FIG. 6) secured to the bow (59) of a watercraft (PWC). By operation of the winch unit (54) as explained in detail hereinafter, the strap (56) can be reeled in or let out to either pull the watercraft (PWC) onto the trailer (20) or to let it slide or float off the trailer (20).

More particularly, the mounting post (46) forward end (47) (FIG. 6) has a lip (61) which provides for receiving a U-bolt fastener (62) for adjustable securement to the tongue (39), and has a plurality of longitudinally spaced, transverse openings (63) formed therein. The post (46) is channel shaped to receive the upper end (52) of the strap (51) therein, the upper end (52) having a transverse passage (64) alignable with any one of the post openings (63) for receiving a fastening bolt (66). The strap lower end (53) also has a lip (67) to receive another U-bolt (68) as a tongue fastener; thus providing for longitudinal and vertical adjustment of the winch mounting post (45).

Figure 7:
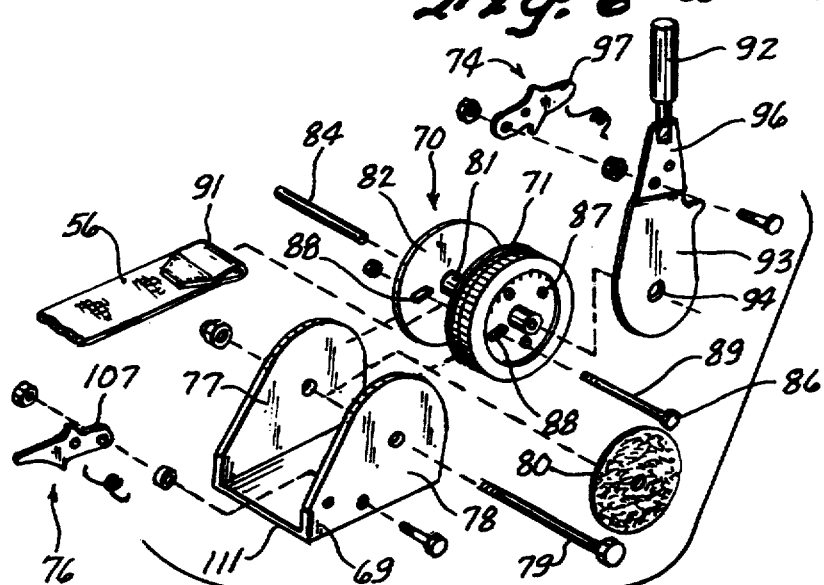
FIG. 7 is an exploded view of the ratchet winch unit of this invention.

Referring to FIG. 7, the winch unit (54) includes generally a U-shaped mounting case or bracket (69) which may be bolted to the upper surface of the post (46) or welded as presently shown; a drum (70) having a sprocket (71) with arcuately formed teeth (72) of a similar diameter secured adjacent to one side (FIG. 5) and for rotatably receiving the winch strap (56); a handle (73); and a pair of pawl units (74), (76). The handle (73) and drum (70) are both rotatably mounted on the bracket sidewalls (77), (78) by a single pivot bolt (79), with one pawl unit (74) mounted on the handle (73) and the other pawl unit (76) mounted on the bracket sidewall (78).

The drum (70) includes a hollow shaft (81) interconnected to its side (82), (83) (FIG. 7), with a bushing (84) inserted therein to receive the pivot bolt (79). The drum (70) and sprocket (71) also have transversely aligned slots (88) formed therein for receiving a bolt (89) off center of the pivot bolt (79) for engaging a loop (91) at the inner end of the flexible strap (56) whereby to provide for the strap (56) being wound on or unwound from the drum shaft (81) according to the rotation of the drum (70). The head (86) of the bolt (89) is contained within an annular cavity (87) formed within the outer side of the sprocket (71).

The handle (73) comprises an upper or outer rod-like grip (92) (FIG. 10) welded to a flat lower or outer portion (93) rounded at its base, with an opening (94) formed therein for receiving the pivot bolt (79), which portion (93) is disposed between the bracket sidewall (78) and the sprocket (71), and with an upper flat portion (96) integral with but offset from the inner portion (93) for mounting the pawl unit (74). A nylon washer (80) (FIGS. 7 and 8) is inserted between the sprocket (71) and the handle inner portion (93) for wear purposes. The pawl unit (74) includes a flat pawl (97) (FIG. 11) one end (98) of which is pivotally secured to the inside surface of the handle portion (93), the other end (99) formed for finger engagement, and with a lower projection (101) and an upper projection (102).

Figure 11:
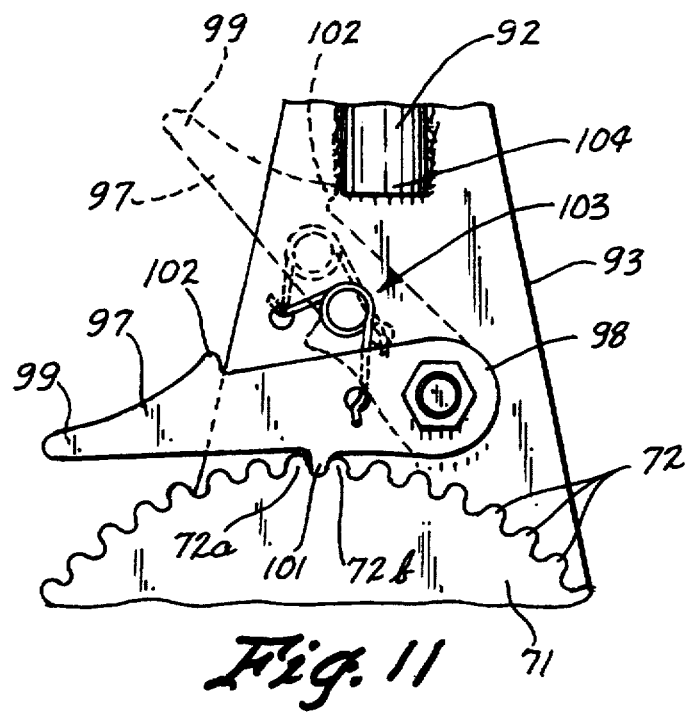
FIG. 11 is a further enlarged, fragmentary side elevational view of the winch unit as taken along the line 11—11 in FIG. 10 and showing action of the winch handle ratchet pawl.
Figure 12:
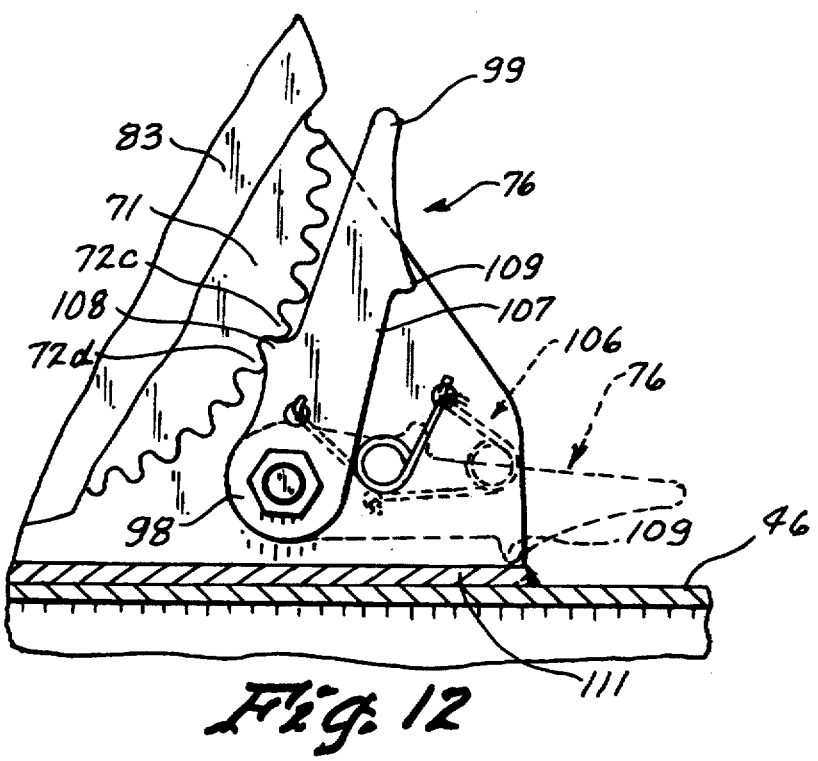
FIG. 12 is a further enlarged fragmentary side elevational view as taken along the line 12—12 in FIG. 10 and showing action of the winch case ratchet pawl.

Referring to FIG. 11, it will be seen that when the ratchet handle pawl (97) is engaged, the projection (101) engages between any two adjacent teeth (72a), (72b) on the sprocket (71); and when the pawl (97) is disengaged, the projection (101) is moved away from the sprocket (71) by finger engagement, and held by a conventional over-center spring unit (103) secured between the handle portion (96) and the pawl (97), with the pawl projection (102) engaged with the handle grip (92) at its lower end (104) and thus prevented from further clockwise rotation. The lower pawl unit (76) (FIG. 12) is identical to the upper pawl unit (74), its spring unit (106) holding the flat pawl (107) with one projection (108) between adjacent sprocket teeth (72c), (72d) or holding it with the other projection (109) held against the base (111) of the bracket (69). Both pawls (97) and (107) are pivotally mounted at their ends (98) by pivot bolts (112), and are finger moved against the bias of each spring unit (103), (106) into and out of sprocket engagement. The handle (73) may have a projection (75) (FIG. 9) formed on a front portion thereof for engagement with the front (75a) of the case base (111) or other raised portion, upon clockwise rotation of the handle (73), to limit such movement.

The bunk unit (26) (FIGS. 1 and 2) comprises a pair of elongated bunks (113), (114) mounted in laterally spaced relation parallel each other, by a pair of mounting brackets (116) at each end to each cross member (32), (33), forming thereby a low silhouette of a bunk bed for receiving the personal watercraft (PWC). The bunks (113), (114) are symmetrically arranged on either side of the trailer longitudinal centerline for balance purposes.

Winch Operation

When both pawls (97), (107) are engaged into the teeth (72) on the drum (70), as the ratchet handle (73) is pulled forward or clockwise (FIG. 9), the drum (70) is turned so that additional strap (56) is wound on the drum (70). When the ratchet handle (73) can no longer be stroked forward, its direction may be reversed. As it is reversed, the ratchet pawl (97) that is attached to the ratchet handle (73) will disengage itself over the teeth (72) of the drum (70) while the ratchet pawl (107) that is fastened to the winch case (69) will keep the drum (70) from reversing. Again as the ratchet handle (73) is pulled forward, its ratchet pawl (97) is engaged while the winch case ratchet pawl (107) slips over the teeth (72) of the drum (70). As the handle (73) is pulled forward, more strap (56) is wound on the drum shaft (81). This action is repeated in a push-pull stroke that is used to wind up the strap (56) until the PWC is pulled into the trailer (20) and into place.

To unwind the winch strap (56) requires a different procedure. First, forward pressure is applied to the ratchet handle (73). This releases the pressure on the ratchet pawl (107) that is mounted to the winch case (69). Disengage this ratchet pawl (107). Allow the pressure on the winch strap (56) to pull the ratchet handle (73) in a counterclockwise direction (FIG. 9) until it can no longer reverse. Re-engage the ratchet pawl (107) mounted to the winch case (69) into the teeth (72) on the drum (70).

Disengage the ratchet pawl (97) on the ratchet handle (73) from the teeth (72) on the drum (70) and turn the ratchet handle (73) clockwise (FIG. 9) with the ratchet pawl (97) disengaged. When the ratchet handle (73) is approximately as far clockwise as it can go, re-engage the ratchet pawl (97) on the handle (73). Apply clockwise pressure to the handle (73), to remove pressure on the ratchet pawl (107), then disengage the ratchet pawl (107). Repeat the above process until the pressure on the winch strap (56) is removed. At this point, both ratchet pawls (97), (107) may be disengaged from the teeth (72) of the drum (70). Now the winch drum (70) is capable of being unwound or wound by simply turning the drum (70) with your hand.

Figure 6:
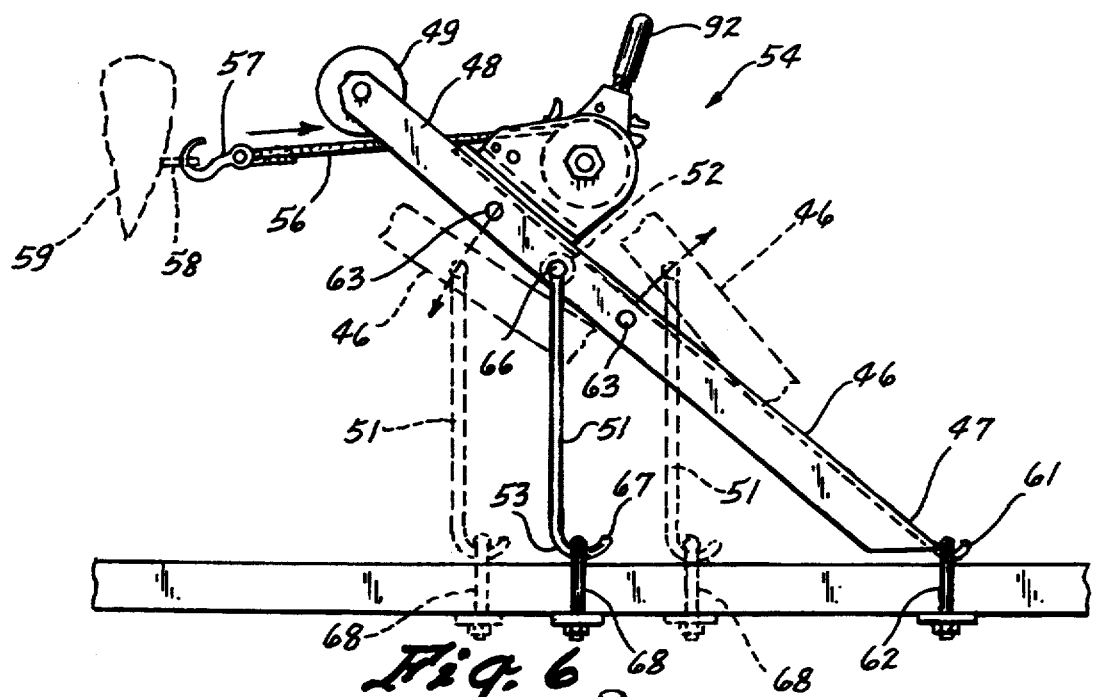
FIG. 6 is a side elevational view as taken along the line 6—6 in FIG. 4, and showing various vertical positions of the winch post.

It can readily be seen that all of the objectives of the invention have been fulfilled. For example, due to the improved winch post structure, the post (46) may be fixed at its forward end (47) to the tongue (39) and vertically moved about the end (47) as a pivot to any one of a plurality of vertically adjustable positions as best seen in FIG. 6. Further, the entire post structure (24) with the winch unit (54) mounted thereon can be moved longitudinally on the tongue (39) to any number of longitudinally spaced locations. These structural winch post features joined with the unique ratchet-type winch structure provide for a very dependable but sleek looking trailer for a single personal watercraft, which trailer is quite user friendly.

I claim:

1. A personal watercraft trailer comprising:
   frame means including a pair of frame portions having forward ends converging together, and including further a pair of cross members interconnecting said frame members;
   tongue means adjustably secured to the frame means adjacent said forward ends for attachment to a prime mover;
   wheel and axle means supporting said frame means;
   means mounted on said cross members for engaging and supporting a watercraft thereon;
   winch means for engagement to a watercraft to be transported by the trailer; and
   means for mounting said winch means on said tongue means including a post adjustably mounted on said tongue means and including further a strap for engagement between said post and said tongue means, said post having one end secured to said tongue means and an opposite end extended toward the watercraft, said post opposite end vertically and longitudinally adjustable relative to said tongue means.

2. The invention of claim 1, and wherein said post has a bow stop secured directly to said opposite end, said winch means including a winch unit mounted on said post intermediate said bow stop and said post one end.

3. The invention of claim 2, and wherein means is provided for adjustably securing said post one end to said tongue means at longitudinally spaced locations along said tongue means.

4. The invention of claim 3, and wherein said post has longitudinally spaced openings formed therein, said strap having an upper end engageable with any one of said openings and having a lower end pivotally secured to said tongue means for pivoting said post about said lower end securement to said tongue means in a vertical manner.

5. The invention of claim 4, and further wherein said strap has a lower end adjustably engageable with and longitudinally of said tongue means.

6. The invention of claim 5, and further wherein said winch unit includes:
   a U-shaped bracket mounted directly on said post adjacent said opposite end;
   a drum rotatably mounted on said bracket and having a flexible member secured at one end to said drum and having a free end;
   a handle unite rotatably mounted on said bracket;
   a sprocket having teeth formed about the periphery thereof, said sprocket, drum and handle all rotatably mounted on a single pivot member secured to said bracket; and
   a pair of pawl assemblies, one said pawl assembly mounted on said handle unit and resiliently engaged with said sprocket teeth, the other said pawl assembly mounted on said bracket and resiliently engaged with said sprocket teeth, said pawl assemblies manually movable independently out of engagement with said sprocket teeth, said pawl assemblies manually movable independently out of engagement with said sprocket teeth, whereby movement of said handle unit in relation to relative positions of engagement and disengagement of said pawl assemblies effect rotation of said drum and a reeling in or out of said flexible member relative to said drum.

7. A watercraft bow engaging mounting structure for use with a boat trailer having a ground engaging frame for supporting a watercraft, and having a tongue member attached to and extended forwardly from a portion of the frame for connection to a prime mover, the structure comprising:
   an elongated post having opposed ends;
   first means for fastening one end of said post to the tongue member, whereby said post extends rearwardly and away from the prime mover connection;
   second means mounted at the opposite end of said post for engagement with the bow of a watercraft supported on the frame, said second means aligned with the longitudinal axis of the post;
   a strap having opposed end portions, one said end portion adjustably secured to said post intermediate said post ends, and the opposite said end portion adjustably secured to the tongue member rearwardly of said first means.

8. The invention of claim 7, and further wherein said post is movable within a vertical plane about said one end fastened to the member.

9. The invention of claim 8, and further wherein said first means is movable longitudinally of the tongue member for longitudinally adjustably securing said post to the tongue member.

10. The invention of claim 7, and further wherein said post has a plurality of openings formed therein in longitudinally spaced relation, said strap one end portion being attachable to any one of said openings for varying the position of said post relative to the tongue member.

11. The invention of claim 10, and further wherein said post has an upper surface, and wherein said means includes a mounting bracket secured to said upper surface of said post and which is mounted on said post intermediate said post one end and said second means, said winch means for effecting a pulling force on the bow of a watercraft supported on the frame.

* * * * *

UNITED STATES PATENT AND TRADEMARK OFFICE
CERTIFICATE OF CORRECTION

PATENT NO. : 5,417,447
DATED : May 23, 1995
INVENTOR(S) : Byron L. Godbersen

It is certified that error appears in the above-indentified patent and that said Letters Patent is hereby corrected as shown below:

Column 6, line 62, in claim 11, line 2, "said" (second occurrence) should be --winch--.

Signed and Sealed this

Twenty-second Day of August, 1995

Attest:

BRUCE LEHMAN

*Attesting Officer*   *Commissioner of Patents and Trademarks*